United States Patent [19]
Karlsson

[11] 3,773,307
[45] Nov. 20, 1973

[54] AIR HUMIDIFYING UNIT
[75] Inventor: Tord Herlog Ingemar Karlsson, Jonkoping, Sweden
[73] Assignee: Aktiebolaget Svenska Flaktfabriken, Nacka, Sweden
[22] Filed: Apr. 19, 1971
[21] Appl. No.: 135,061

[30] Foreign Application Priority Data
Apr. 17, 1970 Sweden.....................5346/70

[52] U.S. Cl............... 261/97, 55/227, 261/DIG. 46
[51] Int. Cl............................................. B01f 3/04
[58] Field of Search.............. 261/3, 28, 29, 94–107, 261/DIG. 15, DIG. 46; 55/227

[56] References Cited
UNITED STATES PATENTS
| | | | |
|---|---|---|---|
| 1,165,348 | 12/1915 | Tait | 261/98 |
| 2,513,174 | 6/1950 | Hess | 55/227 |
| 2,828,761 | 4/1958 | Weibert | 261/97 |
| 3,265,371 | 8/1966 | McGrath | 261/106 |
| 3,337,196 | 8/1967 | McCoy et al. | 261/105 |
| 3,395,900 | 8/1968 | Meek | 261/97 |
| 3,497,453 | 2/1970 | Yurdin | 261/97 |
| 3,290,022 | 12/1966 | Brown, Jr. et al. | 261/29 |

FOREIGN PATENTS OR APPLICATIONS
259,882  10/1926  Great Britain.......................261/98

*Primary Examiner*—Bernard Nozick
*Attorney*—Howson & Howson

[57] ABSTRACT

Air humidifying unit of circulation water type, having an air humidifier arranged over a basin for collection of the circulation water, part of said water being continuously tapped off to limit the content of salts and impurities in the water, said basin having a spillway furnished with water-trap to prevent air communication with the environment, the tapped water being led off through the water-trap of the spillway, whereby this water-trap serves also as outlet for the tapped water.

4 Claims, 4 Drawing Figures

PATENTED NOV 20 1973 3,773,307
Fig.1.
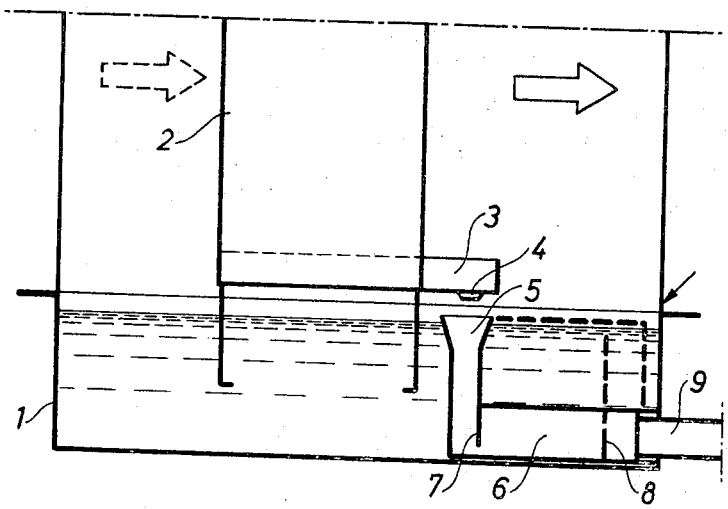
Fig.2
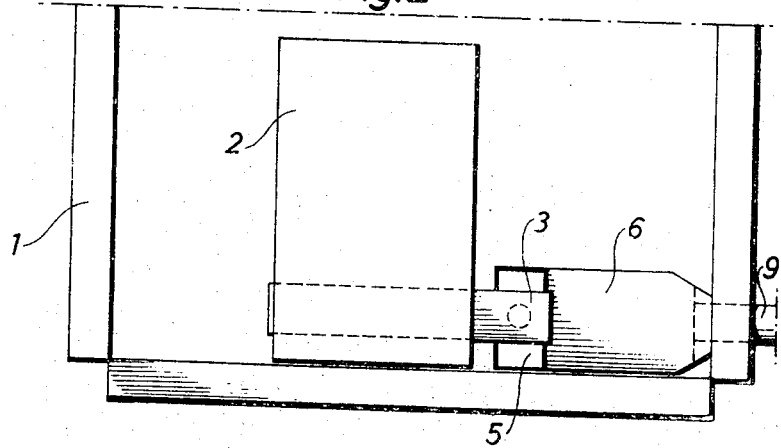
Fig.3 Fig.4
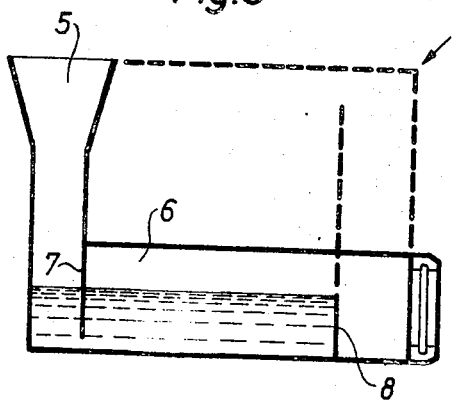 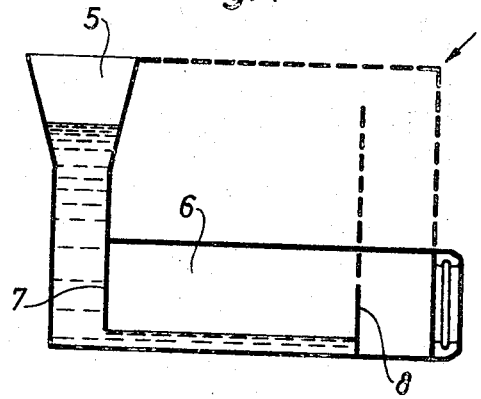
INVENTOR:
TORD HERLOG INGEMAR KARLSSON
BY
Howson & Howson
ATTYS.

AIR HUMIDIFYING UNIT

This invention relates to an air humidifying unit of circulation water type, preferentially for an air humidifying plant and having an air humidifier arranged over a basin for collecting of the circulation water, a part of which is continuously tapped off for limitation of the content of salts and impurities in the water, and with a spillway with water-trap for prevention of air communication with the environment.

Such air humidifiers usually form part of air conditioning systems in buildings for humidification of the ventilation air propelled by fans and carried in closed air ducts to the premises to be humidified. Water is supplied to the humidifier and is evaporated in it. Owing to the low rate of evaporation — at the temperature in question — a relatively large surface of contact is often required between water and air.

In a modern air humidifier this requirement is met by arranging that the water humidifies the porous walls in special corrugated board packages — bodies with a large number of fine channels — and is transferred to the air which passes through said fine channels.

Theoretically the added quantity of water could be as great as that absorbed in the dry premises. But then parts of the humidifier might become more or less permanently dry and coated with salt crystallized out of the water. It is known from experience that such dry portions form undesirable foci for bacteria but — in a known way — are prevented from arising through the fact that an excess of water is supplied to the humidifier and collected in a basin below the humidifier and repumped to it. All salt entering the humidifier with the feed-water then collects in the circulating excess water and the salt content continuously rises. To keep the salt content at a constant low level, therefore, part of the water is tapped off. This part, however, constitutes a loss which should be limited. The salt content in the circulation water is greatest immediately before the latter falls into the basin, and the greatest saving of water can therefore be attained by tapping off from the circulation system a part of this water to bring about the transport of a given quantity of salt.

As the entire humidifying unit consisting of humidifier, fan, basin and drainage device must be entirely separated from the environment, the drainage must be effected via a water-trap. This must be of such a height that a water column can be formed in it of a height sufficient to balance the highest negative or positive pressure in the humidifier. A negative pressure arises if the humidifier is placed on the suction side of the fan and a positive pressure if placed on its pressure side.

As a safety measure against unintentional flooding of the basin, there should always be a spillway from it. For the afore-said reasons the spillway must also have a water-trap of sufficient height.

According to the invention the spillway is arranged inside the side-walls of the basin so that the tapped-off water can run through it. The spillway water-trap, designed in accordance with the invention, can then be used also for the tapped-off water and the water-trap intended for this purpose can thus be eliminated. The invention may therefore be briefly called a combination water-trap.

The invention will now be described with reference to the attached drawings, which show an exemplifying embodiment adapted for the case when the humidifier is placed on the suction side of the fan.

FIG. 1 shows in side-view a combination water-trap placed in the basin,

FIG. 2 shows a view of it from above,

FIGS. 3 and 4 show the water-trap with markings of the water level with fan turned off and turned on, respectively.

In the drawings 1 is a basin above which is a humidifier 2, which is filled with an only partially indicated corrugated board body with porous walls. 3 is a collecting tray for tapped-off water, which is led through a drain-pipe 4 to a spillway or overflow funnel 5. The funnel 5 constitues a part of the water-trap 6 with partition 7 and 8. The bottom and walls of the basin, together with walls not shown, constitute a space which is entirely separated from the environment and is equipped with connecting devices for air ducts and pipes. Only one such pipe is shown in the drawings, namely the discharge pipe 9.

With the humidifying plant in operation, water is supplied to the humidifier 2 and runs through the humidifier body and is partially transferred to the ventilation air, the direction of flow of which is indicated by the arrow in the drawing. The excess water runs down into the basin 1 but some of it is collected by the tray 3 and led through pipe 4 to the funnel 5 of the spillway. To this end, it is noted from FIG. 2 that the collecting tray 3 underlies a limited portion of the humidifier 2. The remainder of the surplus water is pumped back to the humidifier 2 by a pump not shown in the drawing.

The spillway or overflow prevents, in the known manner, the water level in the basin from rising appreciably above the mouth of the funnel 5. The spillway is formed as a part of the water-trap 6, the partitions 7, 8 of which prevent in the known manner the entry of air from the drain-pipe into the humidifying plant. The partition 7 has an opening at the bottom and the partition 8 has an opening at the top. Thus air from the pipe 9 is trapped to the right of the partition 7. When the main fan is shut down, the humidifier 2 is at atmospheric pressure and the water levels on opposite sides of the partition 7 are equal, as shown in FIG. 3. When the fan is operating, the humidifier is below atmospheric pressure and the water level may rise to the levels indicated in FIG. 4 before air will escape through the opening at the bottom of the partition 7. When salty water spills into the funnel 5, both levels rise until the water in the trap 6 is discharged over the partition 8 into the pipe 9. Through the use of the entire depth of water in the basin it has been possible in the present case to make the height of the funnel sufficient to accomodate the water column which balances the negative pressure.

Through the location chosen for the drain-pipe 4 the water-trap 6 and discharge pipe 9 are used both for the spillway water and the tapped water. In the drawing the water-trap 6 is entirely built into the basin. The invention is, however, not limited to this embodiment. The water-trap can also be arranged wholly or partially outside the basin, only the inlet funnel being inside. In the drawing the wall of the basin is shown plane, but it may of course also have other forms.

To prevent clogging of the drain-pipe 4 by salts and impurities, its area should not be less than a given minimum. As the drain-pipe 4 has been given a suitable horizontal area in relation to the area of the humidifier, it is possible according to the invention to determine the quantity of tapped water. Thus, through the invention, no restriction of the tapped water in pipe 4 is necessary.

In FIGS. 1, 3 and 4 a modified form of the device, when the air humidifier and the basin are arranged on the pressure side of the fan, is indicated by an arrow and dotted lines.

What I claim is:

1. In an air humidifying unit of the circulating water type including a humidifier housing, a basin underlying said humidifier housing adapted to supply water to the humidifier, an overflow spillway means in said basin having a funnel opening above which the water level in the basin cannot rise, and a drainage pipe connected to said spillway means, the improvement wherein the unit includes a collection tray positioned in the bottom of said humidifier housing and extending outwardly therefrom above said basin for collecting at least a portion of the water in said humidifier housing, said collection tray including a discharge port means to discharge the collected water directly into said funnel means, said unit including a water trap connected between said spillway funnel and said drainage pipe which provides a column of water to accommodate the pressure differential between the humidifying unit and the drainage pipe and to block direct air communication therebetween.

2. An air humidifying unit according to claim 1 wherein said collection tray extends along a limited portion of the humidifier housing bottom and said discharge port comprises a drain opening extending from the bottom of said collection tray in vertical alignment with the funnel.

3. An air humidifying unit according to claim 2 wherein said drain opening is sufficiently large to discharge all of the water collected in said tray and prevent accumulation of salty water therein and clogging of the opening.

4. An air humidifying unit according to claim 1 wherein said water trap comprises a chamber open at one end to said funnel and open at the other end to said discharge pipe, and two transverse partitions spaced apart in said chamber, the partition closest to said funnel having an opening at the bottom and the partition closest to said discharge pipe having an opening at the top.

* * * * *